US008422366B2

(12) United States Patent
Hirota et al.

(10) Patent No.: US 8,422,366 B2

(45) Date of Patent: Apr. 16, 2013

(54) DATA TRANSMISSION DEVICE

(75) Inventors: Masaki Hirota, Kawasaki (JP); Hiroshi Tomonaga, Kawasaki (JP); Akihiro Hata, Kawasaki (JP); Shigeyuki Kobayashi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 376 days.

(21) Appl. No.: 12/783,754

(22) Filed: May 20, 2010

(65) Prior Publication Data

US 2010/0232291 A1 Sep. 16, 2010

Related U.S. Application Data

(63) Continuation of application No. PCT/JP2007/072565, filed on Nov. 21, 2007.

(51) Int. Cl.

| | |
|---|---|
| ***H04L 12/28*** | (2006.01) |
| ***H04L 12/56*** | (2006.01) |
| *G01R 31/08* | (2006.01) |
| *G06F 11/00* | (2006.01) |
| *G08C 15/00* | (2006.01) |

(52) U.S. Cl.

USPC ............ 370/229; 370/412; 370/413; 370/414

(58) Field of Classification Search .................. 370/229, 370/412, 417, 419

See application file for complete search history.

(56) References Cited

U.S. PATENT DOCUMENTS

| | | | | |
|---|---|---|---|---|
| 5,398,235 | A * | 3/1995 | Tsuzuki et al. | 370/219 |
| 5,485,453 | A * | 1/1996 | Wahlman et al. | 370/389 |
| 6,504,846 | B1 * | 1/2003 | Yu et al. | 370/412 |
| 6,778,536 | B1 * | 8/2004 | Ofek et al. | 370/395.4 |
| 7,116,633 | B2 | 10/2006 | Honda | |
| 8,018,851 | B1 * | 9/2011 | Medina et al. | 370/235 |
| 2001/0038607 | A1 | 11/2001 | Honda | |
| 2004/0057377 | A1 * | 3/2004 | Tinney et al. | 370/230 |
| 2004/0091104 | A1 * | 5/2004 | Kawamura et al. | 380/28 |
| 2004/0141504 | A1 * | 7/2004 | Blanc et al. | 370/394 |
| 2006/0092833 | A1 * | 5/2006 | Bemmel et al. | 370/229 |
| 2006/0285488 | A1 | 12/2006 | Honda | |

(Continued)

FOREIGN PATENT DOCUMENTS

| | | |
|---|---|---|
| JP | 8-186575 | 7/1996 |
| JP | 2000-49860 | 2/2000 |

(Continued)

OTHER PUBLICATIONS

Notification of Reason for Refusal dated Apr. 12, 2011, from corresponding Japanese Application No. 2009-542443.

(Continued)

*Primary Examiner* — Farah Faroul

(74) *Attorney, Agent, or Firm* — Katten Muchin Rosenman LLP

(57) ABSTRACT

In a data transmission device and method provided with duplexed switches outputting frames in the order of input for continuing the communication without instantaneous interruptions even though one of the switches is faulted, input interfaces generate frames in which every time data is inputted, input order information indicating the input order is added to the data together with unique information of each input interface and providing the frame generated to the switches in parallel. At least one output interface sequentially stores the frames outputted from the switches for every unique information and selects a first arrived frame among the frames stored with same input order information.

18 Claims, 15 Drawing Sheets

DATA TRANSMISSION DEVICE 1

DATA

INPUT INTERFACE IFi_1

SEQUENCE NO. SN

FR3 FR2 FR1 FRAME (OUTPUT IF NO. (ON)="1"; INPUT IF NO. (IN)="1")

INPUT INTERFACE IFi_2

FR6 FR5 FR4

(ON="1"; IN="2")

SWITCH SW0

SWITCH SW1

OUTPUT INTERFACE IFo_1

SELECTION

FR3 FR3 FR2 FR2 FR1 FR1

FR6 FR6 FR5 FR5 FR4 FR4

DT 6 DT 3 DT 5 DT 2 DT 4 DT 1

U.S. PATENT DOCUMENTS

2007/0223372 A1* 9/2007 Haalen et al. ................ 370/229
2008/0219269 A1* 9/2008 Minkenberg et al. ...... 370/395.4
2008/0279181 A1 11/2008 Shake et al.
2010/0046534 A1* 2/2010 Kurosaki et al. ............. 370/401

FOREIGN PATENT DOCUMENTS

JP 2000-124949 4/2000
JP 2001-53781 2/2001
JP 2001-292164 10/2001
JP 2004-173146 6/2004
JP 2006-174406 6/2006

OTHER PUBLICATIONS

International Search Report dated Feb. 19, 2008, from the corresponding International Application.

* cited by examiner

DATA TRANSMISSION DEVICE 1
DATA
DT 1
DT 2
DT 3
DT 4
DT 5
DT 6
INPUT INTERFACE IFi_1
SEQUENCE NO. SN
FRAME
FR1
FR2
FR3
(OUTPUT IF NO. (ON)="1", INPUT IF NO. (IN)="1")
INPUT INTERFACE IFi_2
FR4
FR5
FR6
(ON="1", IN="2")
SWITCH SW0
SWITCH SW1
OUTPUT INTERFACE IFo_1
SELECTION

DATA TRANSMISSION DEVICE 1
DATA
DT 1
DT 2
DT 3
INPUT INTERFACE IFi_1
SEQUENCE NO. SN
3 2 1
FR3 FR2 FR1
FRAME
(OUTPUT IF NO. (ON)="1"; INPUT IF NO. (IN)="1")
DT 4
DT 5
DT 6
INPUT INTERFACE IFi_2
3 2 1
FR6 FR5 FR4
(ON="1"; IN="2")
FAULT OCCURRENCE
SWITCH SW0
SWITCH SW1
OUTPUT INTERFACE IFo_1
SELECTION
FR3 FR2 FR1
FR6 FR5 FR4
DT 6
DT 3
DT 5
DT 2
DT 4
DT 1

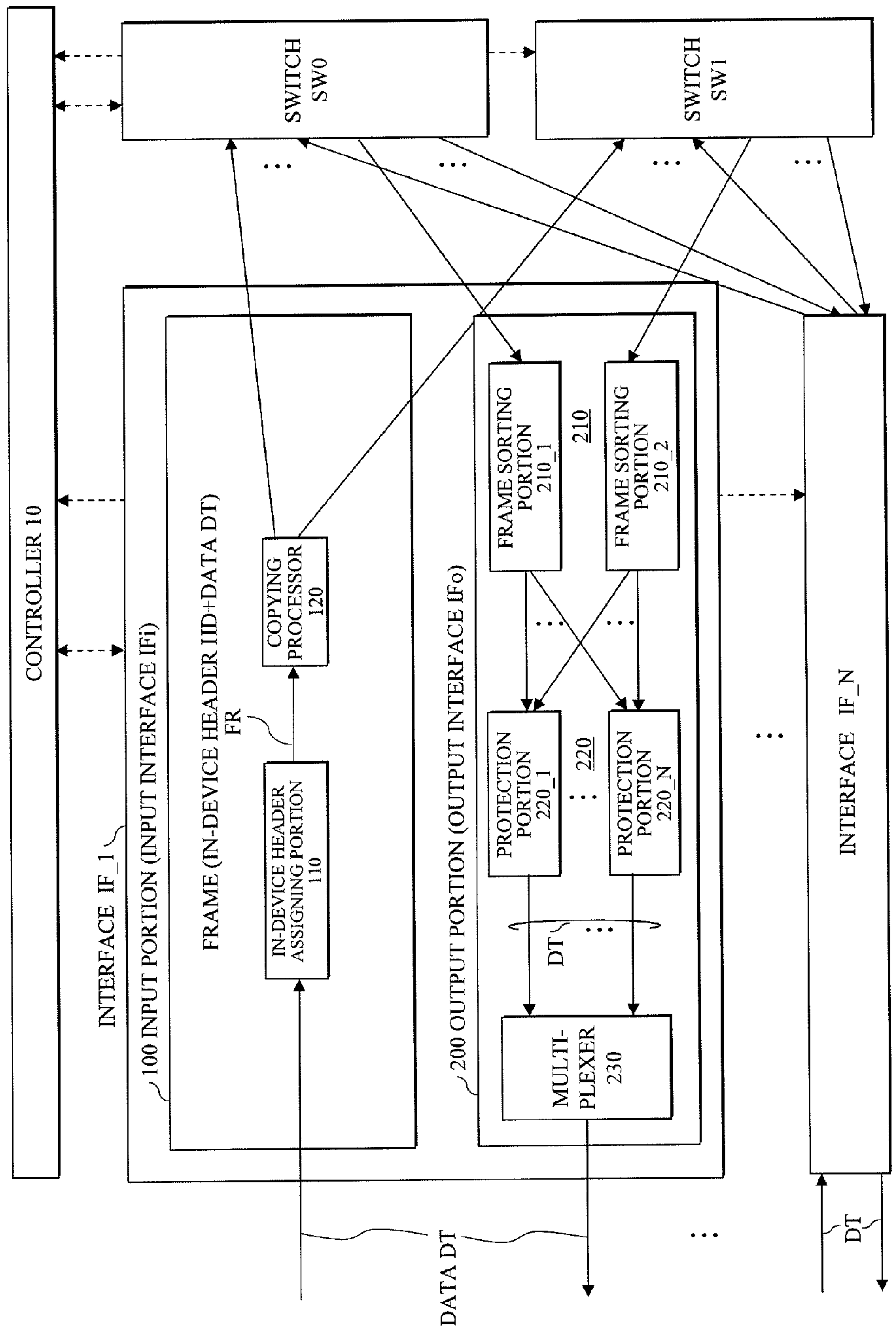
FIG. 3
DATA TRANSMISSION DEVICE 1
CONTROLLER 10
SWITCH SW0
SWITCH SW1
INTERFACE IF_1
100 INPUT PORTION (INPUT INTERFACE IFi)
FRAME (IN-DEVICE HEADER HD+DATA DT)
FR
IN-DEVICE HEADER ASSIGNING PORTION 110
COPYING PROCESSOR 120
200 OUTPUT PORTION (OUTPUT INTERFACE IFo)
FRAME SORTING PORTION 210_1
FRAME SORTING PORTION 210_2
210
PROTECTION PORTION 220_1
PROTECTION PORTION 220_N
220
DT
MULTI-PLEXER 230
INTERFACE IF_N
DATA DT
DT

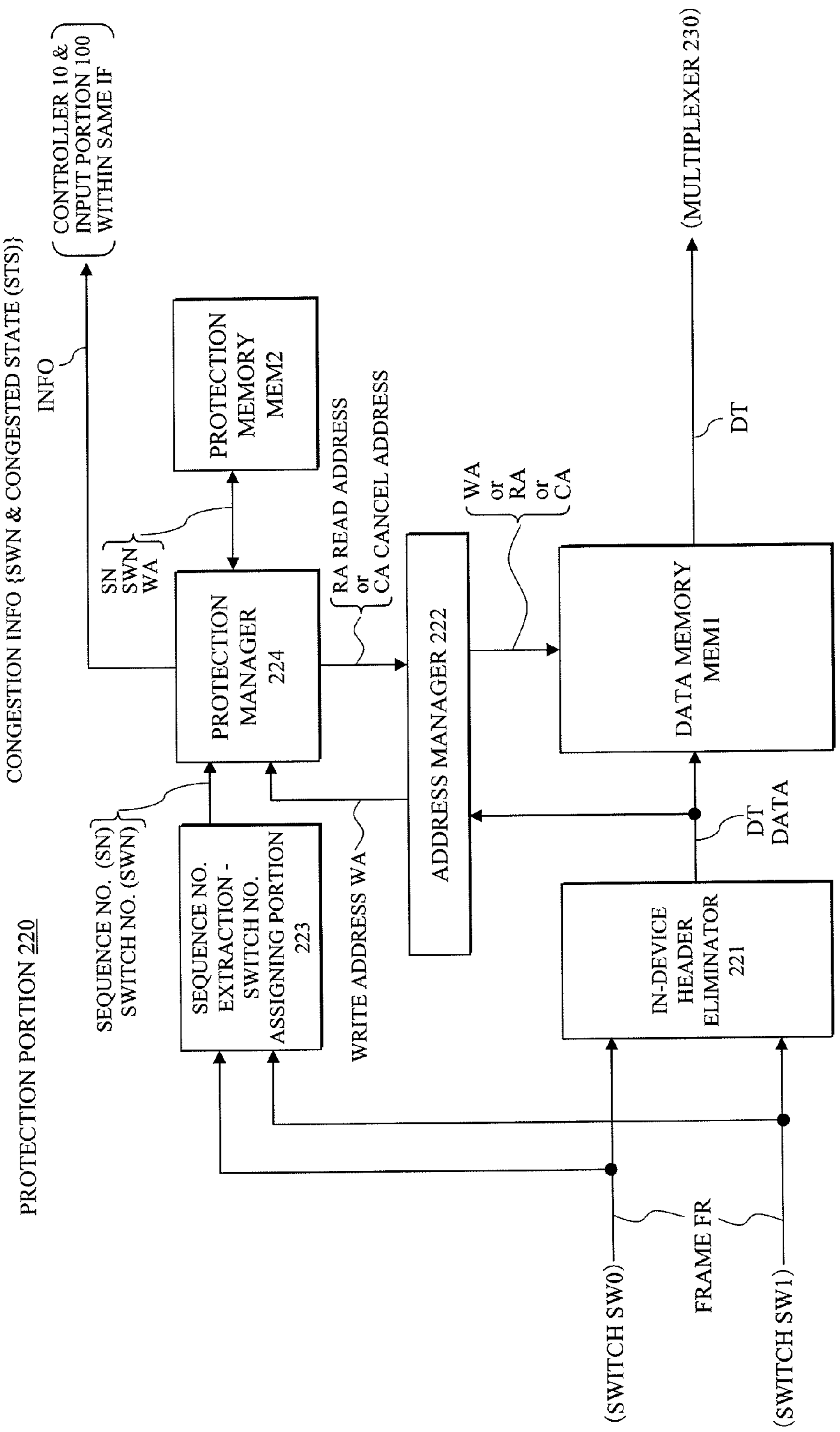

FIG. 5
PROTECTION PORTION 220
CONGESTION INFO {SWN & CONGESTED STATE (STS)}
INFO
CONTROLLER 10 & INPUT PORTION 100 WITHIN SAME IF
PROTECTION MEMORY MEM2
SN SWN WA
PROTECTION MANAGER 224
RA READ ADDRESS or CA CANCEL ADDRESS
(MULTIPLEXER 230)
DT
WA or RA or CA
ADDRESS MANAGER 222
DATA MEMORY MEM1
SEQUENCE NO. (SN) SWITCH NO. (SWN)
SEQUENCE NO. EXTRACTION - SWITCH NO. ASSIGNING PORTION 223
WRITE ADDRESS WA
DT DATA
IN-DEVICE HEADER ELIMINATOR 221
(SWITCH SW0)
FRAME FR
(SWITCH SW1)

FIG. 6A DATA MEMORY MEM1

| ADDRESS | DATA |
|---|---|
| A1 | DT1 |
| A2 | DT1 |
| A3 | DT2 |
| A4 | DT2 |
| A5 | DT3 |
| A6 | DT3 |
| ⋮ | ⋮ |

FIG. 6B PROTECTION MEMORY MEM2

| ADDRESS | SEQUENCE NO. (SN) | SWITCH NO. (SWN) | DATA MEMORY ADDRESS (WRITE ADDRESS WA) |
|---|---|---|---|
| B1 | 1 | 0 (SW0) | A1 |
| B2 | 1 | 1 (SW1) | A2 |
| B3 | 2 | 1 | A3 |
| B4 | 2 | 0 | A4 |
| B5 | 3 | 0 | A5 |
| B6 | 3 | 1 | A6 |
| ⋮ | ⋮ | ⋮ | ⋮ |

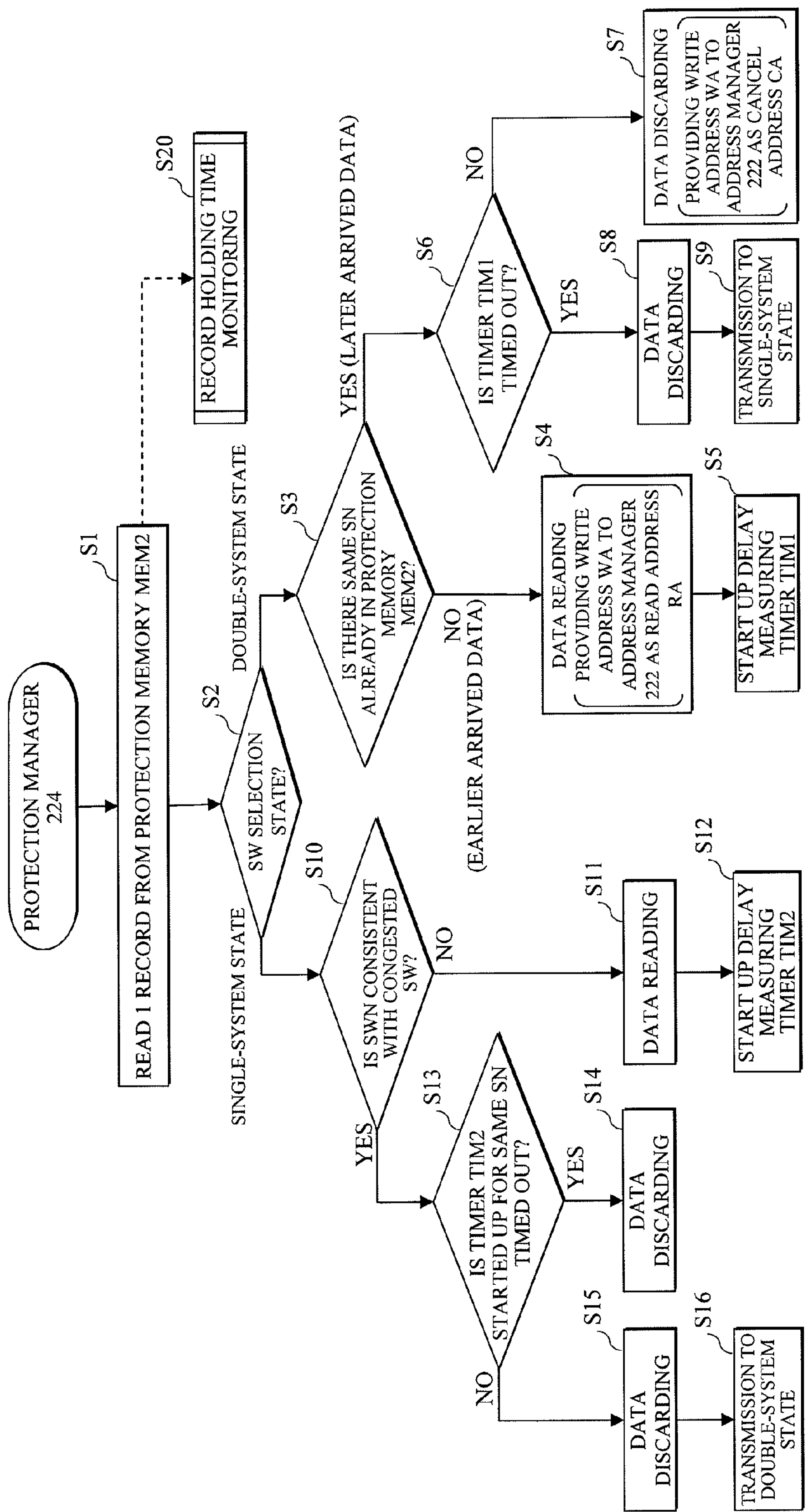
FIG. 7
PROTECTION MANAGER 224
S1
READ 1 RECORD FROM PROTECTION MEMORY MEM2
S20
RECORD HOLDING TIME MONITORING
S2
SW SELECTION STATE?
DOUBLE-SYSTEM STATE
SINGLE-SYSTEM STATE
S3
IS THERE SAME SN ALREADY IN PROTECTION MEMORY MEM2?
YES (LATER ARRIVED DATA)
NO (EARLIER ARRIVED DATA)
S4
DATA READING
PROVIDING WRITE ADDRESS WA TO ADDRESS MANAGER 222 AS READ ADDRESS RA
S5
START UP DELAY MEASURING TIMER TIM1
S6
IS TIMER TIM1 TIMED OUT?
YES
NO
S7
DATA DISCARDING
PROVIDING WRITE ADDRESS WA TO ADDRESS MANAGER 222 AS CANCEL ADDRESS CA
S8
DATA DISCARDING
S9
TRANSMISSION TO SINGLE-SYSTEM STATE
S10
IS SWN CONSISTENT WITH CONGESTED SW?
NO
YES
S11
DATA READING
S12
START UP DELAY MEASURING TIMER TIM2
S13
IS TIMER TIM2 STARTED UP FOR SAME SN TIMED OUT?
YES
NO
S14
DATA DISCARDING
S15
DATA DISCARDING
S16
TRANSMISSION TO DOUBLE-SYSTEM STATE

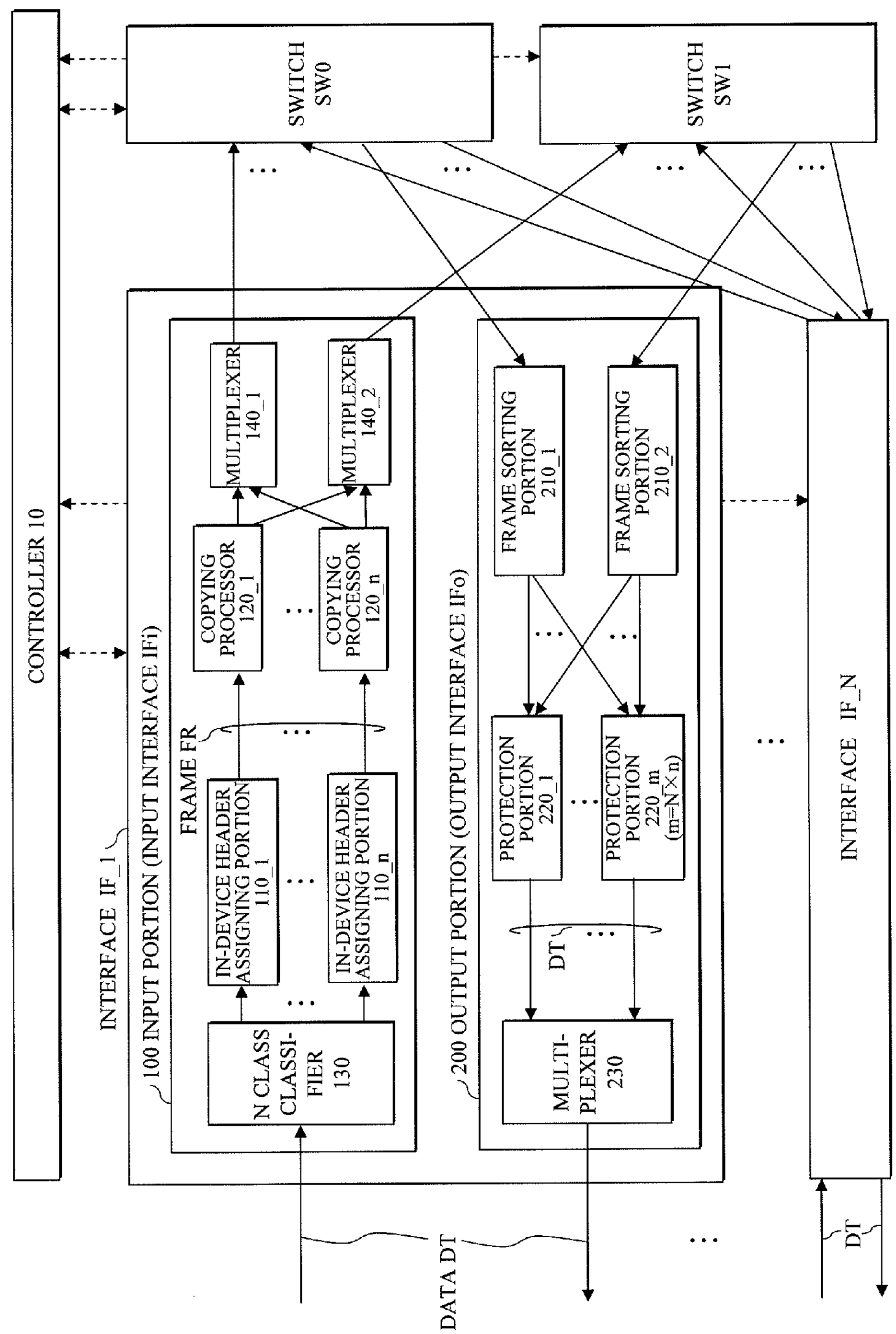
FIG. 12
DATA TRANSMISSION DEVICE 1
CONTROLLER 10
SWITCH SW0
SWITCH SW1
INTERFACE IF_1
100 INPUT PORTION (INPUT INTERFACE IFi)
N CLASSIFIER 130
IN-DEVICE HEADER ASSIGNING PORTION 110_1
IN-DEVICE HEADER ASSIGNING PORTION 110_n
FRAME FR
COPYING PROCESSOR 120_1
COPYING PROCESSOR 120_n
MULTIPLEXER 140_1
MULTIPLEXER 140_2
200 OUTPUT PORTION (OUTPUT INTERFACE IFo)
FRAME SORTING PORTION 210_1
FRAME SORTING PORTION 210_2
PROTECTION PORTION 220_1
PROTECTION PORTION 220_m (m=N×n)
DT
MULTIPLEXER 230
INTERFACE IF_N
DATA DT
DT

PRIOR ART

DATA TRANSMISSION DEVICE

CROSS-REFERENCE TO RELATED APPLICATION

This application is a continuation of International Application PCT/JP2007/72565 filed on Nov. 27, 2007, the contents of which are herein wholly incorporated by reference.

FIELD

The present invention relates to a data transmission device for transmitting or relaying data with switches made redundant.

BACKGROUND

Related art examples [1] and [2] of such a data transmission device will be described below by referring to FIGS. 14 and 15.

Related Art Example [1]

(1:1 Redundancy System): FIG. 74

A data transmission device 1*a* depicted in FIG. 14A has adopted a 1:1 redundancy system, being composed of e.g. a duplexed switches $SW_0$ and $SW_1$ (hereinafter, occasionally represented by a reference character SW), an N number of input interfaces IFi_1-IFi_N (hereinafter, occasionally represented by a reference character IFi) for providing received data DT to either one of the switches $SW_0$ and $SW_1$, output interfaces IFo_1-IFo_N (hereinafter, occasionally represented by a reference character IFo) for outputting the data DT outputted from the switch $SW_0$ or $SW_1$ to a latter stage and a controller 10 for controlling the input interface IFi, the switch SW and the output interface IFo.

In operation, firstly the controller 10 provides to the input interface IFi a selecting instruction INS for instructing to select the switch $SW_0$ in a working system.

Taking as an example a case where as depicted the data DT destined for a device at a latter stage (not depicted) of the output interface IFo_1 is inputted to the input interface IFi_1, the input interface IFi_1 provides the data DT only to the switch $SW_0$, which outputs the data DT to the output interface IFo_1.

On the other hand, when a fault occurs in the switch $SW_0$ in the working system as depicted in FIG. 14B, the switch $SW_0$ transmits a fault notification FL to the controller 10. The controller 10 provides to the input interface IFi_1 the selecting instruction INS for instructing to switch over to the switch $SW_1$ in the working system free from a fault occurrence to output the data DT.

This enables the data DT to be received at the output interface IFo_1 through the switch $SW_1$, whereby the data transmission device 1*a* can continue to perform the data transmission.

Related Art Example [2]

(1+1 Redundancy System): FIG. 15

A data transmission device 1*b* depicted in FIG. 15A has adopted a 1+1 redundancy system, different from the above related art example [1] in that the input interface IFi provides the data DT to the switches $SW_0$ and $SW_1$ in parallel, and the output interface IFo selects the data DT outputted from one of the switches $SW_0$ and $SW_1$ based on the selecting instruction INS from the controller 10 and discards the data DT outputted from the other one.

As depicted in FIG. 15B, when a fault occurs in the switch $SW_0$ in the working system, the controller 10 having received the fault notification FL from the switch $SW_0$ provides to the output interface IFo_1 the selecting instruction INS for instructing to select only the data DT outputted from the switch $SW_1$.

Thus, even upon a fault occurrence in the switch SW, the data transmission device 1*b* can continue to perform the data transmission as with the above related art example [1].

There are the following reference examples (1) and (2) in the art:

REFERENCE EXAMPLE (1)

A communication network system where a frame having stored a sequence number is transmitted/received between wireless terminals and each terminal can recognize that there are two terminals which are a hidden terminal in a positional relationship when the continuity of the sequence number stored in the received frame is missing (See e.g. Japanese Laid-open Patent Publication No. 2004-173146).

REFERENCE EXAMPLE (2)

A transmission line switching system where a transmission equipment on a transmission line upstream side sends out a monitoring cell into both of a working transmission line and a protection transmission line, a transmission equipment on a downstream side adjusts a transmission delay of both of the transmission lines and the transmission lines are switched over when the transmission delays of both transmission lines are equalized (See e.g. Japanese Laid-open Patent Publication No. 08-186575).

While the above related art examples [1] and [2] can continue to perform the data transmission when a fault occurs in the switch, the selection/switchover processing is required with the fault occurrence being triggered, so that during the switchover processing a short break can occur, disadvantageously failing to transmit the data.

SUMMARY

[1] According to an aspect of the invention, a data transmission device includes: switches with redundancy, each outputting a frame in its input order; input interfaces, each coupled to each switch, generating frames in which every time data is inputted, input order information indicating the input order is added to the data together with unique information of each input interface and providing the frames generated to the switches in parallel; and at least one output interface sequentially storing the frames outputted from the switches for every unique information and selecting a first arrived frame among the frames stored with same input order information.

[2] In the above [1], the output interface may store the frames in association with the switches having outputted the frames, determine that when the frames stored with the same input order information after a first specified time has lapsed from the selecting of the first arrived frame are detected, the switch corresponding to the frames detected is in a congested state and exclude following frames outputted from the switch in the congested state from being selected.

[3] Also, in the above [2], after the frames outputted from the switch in the congested state are excluded from the selecting and before a second specified time has lapsed from the selecting of the first arrived frame, when the frames outputted from the switch in the congested state and stored with the same input order information are detected, the output interface may determine that the congested state is released and include following frames outputted out of the switch released from the congested state, as frames to be selected again.

[4] Also, in the above [2], the data transmission device may further include a controller controlling the input interfaces and the output interface, wherein the output interface notifies information of the switch in the congested state to the input interfaces through the controller, thereby stopping the input interfaces from outputting the frames to the switch in the congested state.

[5] Also, in the above [4], the output interfaces may deem that the congested state is released when a second specified time has lapsed from the notification of the information of switch in the congested state and notify through the controller the information of the switch released from the congested state to the input interfaces, thereby restarting the input interfaces to output the frames to the switch released from the congested state.

[6] Also, in the above [2], the input interfaces and the output interfaces may be provided in pairs, in which one output interface having first determined the switch in the congested state notifies to one input interface forming a pair with the one output interface the information of the switch in the congested state to stop the one input interface from outputting the frames to the switch in the congested state and generates frames added with the information of the switch in the congested state to be provided to the other switches, thereby allowing the other output interfaces to determine the switch in the congested state and to notify the information of the switch in the congested state to the other input interfaces to stop the other input interfaces from outputting the frames to the switch in the congested state.

[7] Also, in the above [6], the one output interface may deem that the congested state is released when a second specified time has lapsed from the notification of the information of switch in the congested state and notify the information of the switch released from the congested state to the one input interfaces to restart the one input interface to output the frames to the switch released from the congested state and add the information of the switch released from the congested state to the frames to be provided to each switch in parallel, thereby allowing the other output interfaces to determine the switch released from the congested state and to notify to the other input interfaces the information of the switch released from the congested state, thereby restarting the other input interfaces to output the frames to the switch released from the congested state.

[8] Also, in the above [1], the input interfaces may classify the data into a plurality of classes based on specified information within the data and generate a frame in which class information, the unique information and the input order information are added to the data per each class, where the switches perform a priority control upon outputting the frames based on the class information and the output interface sequentially stores the frames outputted from the switches per each unique information and class information.

[9] Also, in the above [1], the input order information may include a sequence number or time stamp.

[10] Furthermore, in the above [9], if the sequence number is a number circulated within specified numerical values, the output interface may eliminate a frame stored after a first arrived frame by a fixed time which the sequence number can circulate, the frame stored and the first arrived frame have same sequence number.

Namely, there is a possibility that depending on area size storing the sequence number, the same sequence number is added to different data. Even in this case, for accurately determining the earlier or later arrival of data, the output interface eliminates the stored frame (i.e. frame already determined if it arrived earlier or later) in a fixed time.

[11] According to a further aspect of the invention, a data transmission method includes: a step of each of switches with redundancy outputting a frame in its input order; a step of input interfaces, each coupled to each switch, generating frames in which every time data is inputted, input order information indicating the input order is added to the data together with unique information of each input interface and providing the frames generated to the switches in parallel; and a step of at least one output interface sequentially storing the frames outputted from the switches for every unique information and selecting a first arrived frame among the frames stored with same input order information.

[12] In the above [11], the output interface may store the frames in association with the switches having outputted the frames, determine that when the frames stored with the same input order information after a first specified time has lapsed from the selecting of the first arrived frame are detected, the switch corresponding to the frames detected is in a congested state and exclude following frames outputted from the switch in the congested state from being selected.

[13] Also in the above [12], after the frames outputted from the switch in the congested state are excluded from the selecting and before a second specified time has lapsed from the selecting of the first arrived frame, when the frames outputted from the switch in the congested state and stored with the same input order information are detected, the output interface may determine that the congested state is released and includes following frames outputted out of the switch released from the congested state, as frames to be selected again.

[14] Also in the above [12], the data transmission method further includes a step of a controller controlling the input interfaces and the output interface, wherein the output interface notifies information of the switch in the congested state to the input interfaces through the controller, thereby stopping the input interfaces from outputting the frames to the switch in the congested state.

[15] Also in the above [14], the output interfaces may deem that the congested state is released when a second specified time has lapsed from the notification of the information of switch in the congested state and notify through the controller the information of the switch released from the congested state to the input interfaces, thereby restarting the input interfaces to output the frames to the switch released from the congested state.

[16] Also in the above [12], the input interfaces and the output interfaces may be provided in pairs, in which one output interface having first determined the switch in the congested state notifies to one input interface forming a pair with the one output interface the information of the switch in the congested state to stop the one input interface from outputting the frames to the switch in the congested state and generates frames added with the information of the switch in the congested state to be provided to the other switches, thereby allowing the other output interfaces to determine the switch in the congested state and to notify the information of the switch in the congested state to the other input interfaces to stop the other input interfaces from outputting the frames to the switch in the congested state.

[17] Also, in the above [16], the one output interface may deem that the congested state is released when a second specified time has lapsed from the notification of the information of switch in the congested state and notify the information of the switch released from the congested state to the one input interfaces to restart the one input interface to output the frames to the switch released from the congested state and add the information of the switch released from the congested state to the frames to be provided to each switch in parallel, thereby allowing the other output interfaces to determine the switch released from the congested state and to notify to the other input interfaces the information of the switch released from the congested state, thereby restarting the other input interfaces to output the frames to the switch released from the congested state.

[18] Also, in the above [11], the input interfaces may classify the data into a plurality of classes based on specified information within the data and generate a frame in which class information, the unique information and the input order information are added to the data per each class, where the switches perform a priority control upon outputting the frames based on the class information and the output interface sequentially stores the frames outputted from the switches per each unique information and class information.

[19] Also, in the above [11], the input order information may include a sequence number or time stamp.

[20] Furthermore, in the above [19], if the sequence number is a number circulated within specified numerical values, the output interface may eliminate a frame stored after a first arrived frame by a fixed time which the sequence number can circulate, the frame stored and the first arrived frame have same sequence number.

The object and advantages of the embodiment will be realized and attained by means of the elements and combinations particularly pointed out in the claims.

It is to be understood that both the foregoing general description and the following detailed description are exemplary and explanatory and are not restrictive of the invention as claimed.

BRIEF DESCRIPTION OF DRAWINGS

FIG. 3 is a block diagram depicting an arrangement of an embodiment [1] of a data transmission device and method;

FIG. 5 is a block diagram depicting an arrangement of a protection portion used in an embodiment [1] of a data transmission device and method;

FIGS. 6A and 6B are charts depicting respective arrangements of a data memory and a protection memory used in an embodiment [1] of a data transmission device and method;

FIG. 7 is a flow chart depicting an operation of a protection manager used in an embodiment [1] of a data transmission device and method;

FIG. 12 is a block diagram depicting an arrangement of an embodiment [2] of a data transmission device and method;

DESCRIPTION OF EMBODIMENTS

Embodiments [1] and [2] of a data transmission device and method according to the present invention will now be described referring to FIGS. 1-13.

Embodiment [1]: FIGS. 1-11

SCHEMATIC OPERATION EXAMPLE

Figure 1:
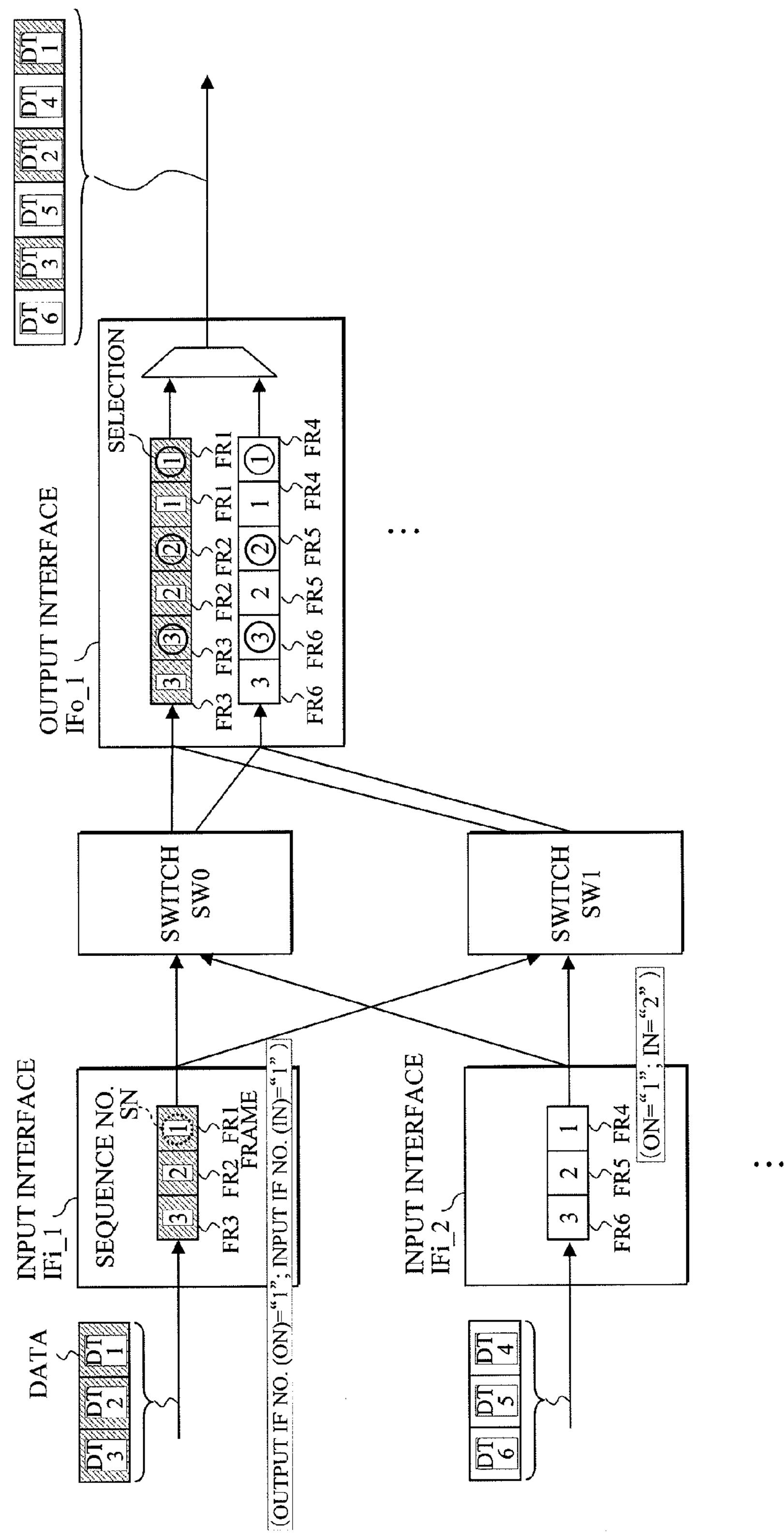
FIG. 1 is a block diagram depicting a schematic operation example in a case where no fault occurs in a switch in an embodiment [1] of a data transmission device and method.
Figure 2:
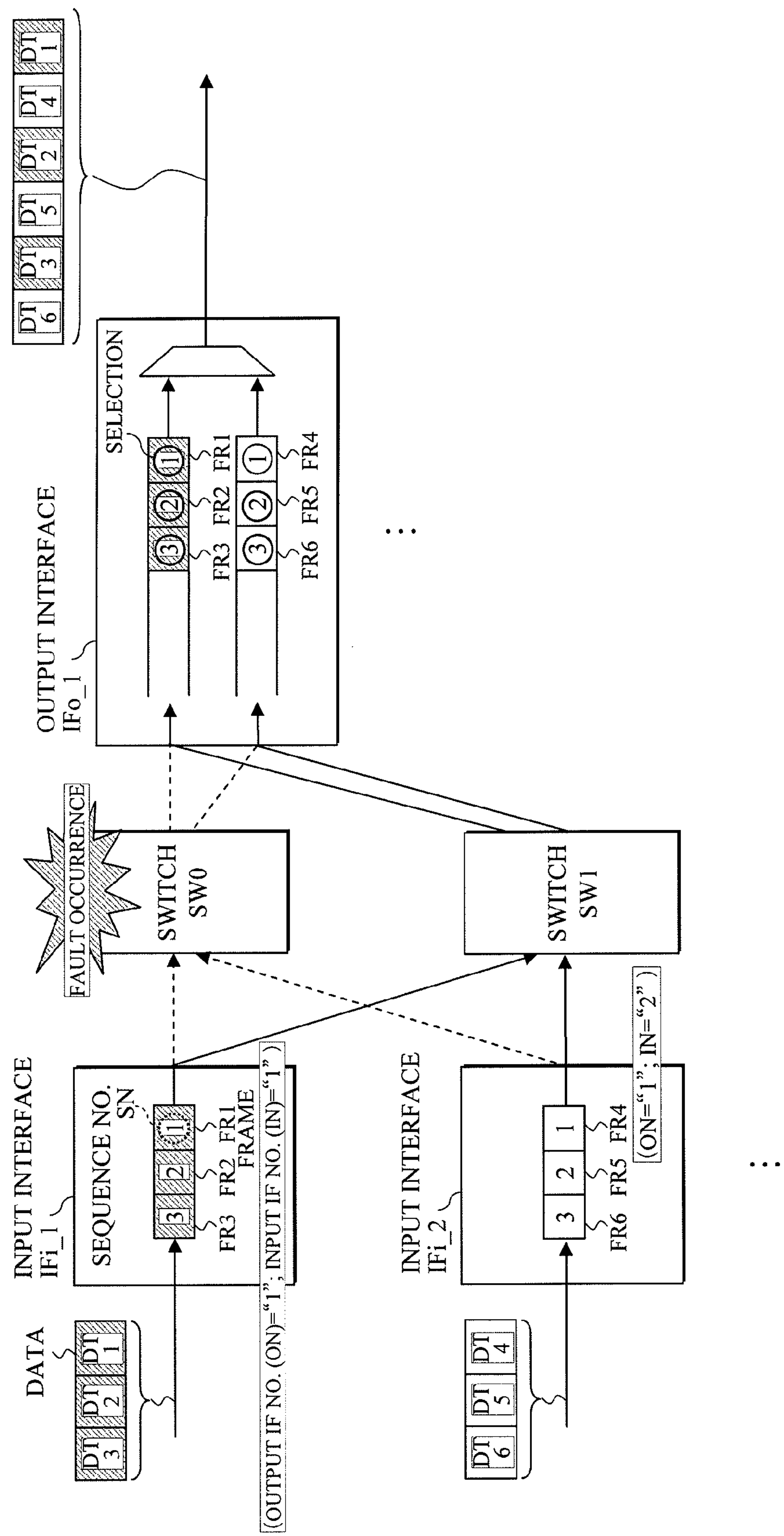
FIG. 2 is a block diagram depicting a schematic operation example in a case where a fault occurs in a switch in an embodiment [1] of a data transmission device and method.

FIGS. 1 and 2

FIG. 1 depicts a schematic operation example in a case where no fault occurs in both of the switches $SW_0$ and $SW_1$ within a data transmission device 1 according to an embodiment [1] of the present invention, and FIG. 2 depicts a schematic operation example in a case where a fault occurs in the switch $SW_0$.

When as depicted by hatching in FIG. 1, three data $DT_1$-$DT_3$ destined for a latter stage device (not depicted) of an output interface IFo_1 are sequentially inputted to an input interface IFi_1, the input interface IFi_1 generates a frame $FR_1$ in which an IF No. of the output interface IFo_1 (ON)="1", an IF No. of its own (IN)="1" and a sequence No. (SN)="1" are added to the data $DT_1$ first inputted and provides it to the switches $SW_0$ and $SW_1$ in parallel.

Then, the input interface IFi_1 generates frames $FR_2$ and $FR_3$ in which to the following data $DT_2$ and $DT_3$, sequence Nos. (SN)="2" and "3" respectively together with the output IF No. (ON)="1" and the input IF No. (IN)="1" are added respectively, and provides them sequentially to the switches $SW_0$ and $SW_1$ in parallel.

Also, an input interface IFi_2 having received three data $DT_4$-DT6 destined for the output interface IFo_1 generates frames $FR_4$-FR6 in which to the data $DT_4$-DT6, sequence Nos. (SN)="1"-"3" together with the output IF No. (ON)="1" and the input IF No. (IN)="2" are added respectively, and provides them to the switches $SW_0$ and $SW_1$ in parallel.

The switches $SW_0$ and $SW_1$ respectively provide the frames $FR_1$-FR6 in the order of input to the output interface IFo_1 corresponding to the output IF No. (ON)="1".

Therefore, the output interface IFo_1 receives the frames $FR_1$-FR6 in parallel and in duplicate from the switches $SW_0$ and $SW_1$, where according to the input IF No. (IN), as depicted in FIG. 1, the output interface IFo_1 stores separately the frames $FR_1$-$FR_3$ generated by the input interface IFi_1 and the frames $FR_4$-FR6 generated by the input interface IFi_2. Then, the output interface IFo_1 selects the first one circled among the same sequence No. (SN).

Then, the output interface IFo_1 sequentially eliminates the output IF No. (ON), the input No. (IN) and the sequence No. (SN) from the selected frames $FR_1$-FR6 to reproduce the original data $DT_1$-DT6 and multiplexes the reproduced data $DT_1$-DT6 to be outputted to the latter stage.

On the other hand, when a fault occurs in the switch $SW_0$ as depicted in FIG. 2, the frames $FR_1$-FR6 only from the switch $SW_1$ are outputted, so that the output interface IFo_1 selects all of the frames $FR_1$-FR6 for the switch $SW_1$ to be transferred in the form of the data $DT_1$-DT6.

Hereinafter, a specific arrangement and operation of the data transmission device for realizing the above will be described referring to FIGS. 3-11.

Figure 4:
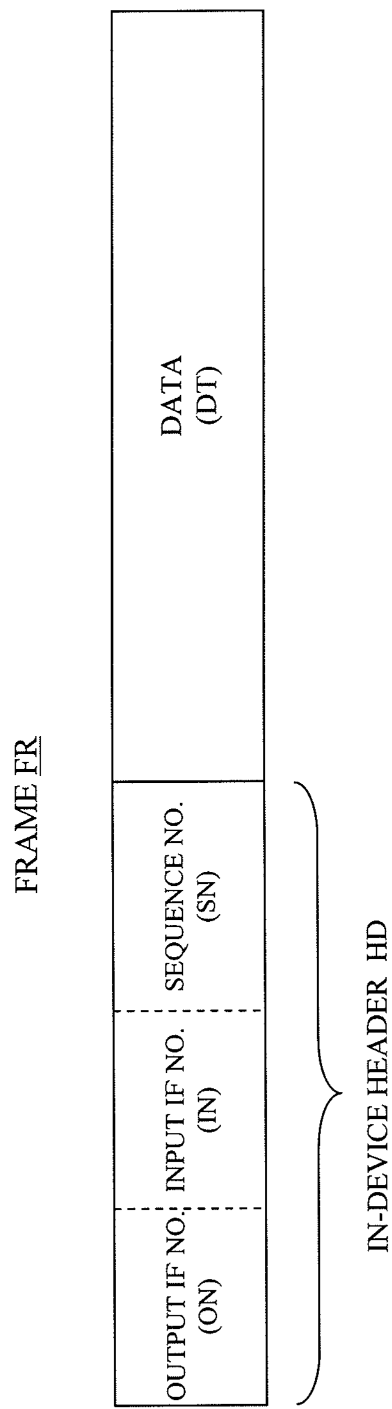
FIG. 4 is a frame format diagram used in an embodiment [1] of a data transmission device and method.

Arrangement: FIGS. 3-5

The data transmission device 1 depicted in FIG. 3 is composed of the duplexed switches $SW_0$ and $SW_1$, an N number of interfaces IF_1-IF_N (hereinafter, occasionally represented by a reference character IF) and a controller 10 for controlling the interface IF and the switch SW.

The input interface IFi depicted in FIGS. 1 and 2 corresponds to an input portion 100 of each interface IF and the output interface IFo corresponds to an output portion 200 of each interface IF, where the input portion 100 and the output portion 200 are provided in pairs.

The input portion 100 is composed of an in-device header assigning portion no which assigns an in-device header HD to inputted data DT to generate a frame FR, and a copying processor 120 which copies the frame FR outputted from the in-device header assigning portion no to be provided to the switches $SW_0$ and $SW_1$ in parallel.

It is to be noted that the above noted in-device header HD is composed of as depicted in FIG. 4, an IF No. of an output interface (output portion 200) (ON) that is a destination of the frame FR, an IF No. of an input interface (input portion 200 itself) (IN) and a sequence No. (SN) indicating the input order of the data DT, where instead of the sequence No. (SN) a time stamp indicating an input time of the data DT may be used.

Also the output portion 200 is composed of frame sorting portions 210_1 and 210_2 respectively sorting the frame FR outputted from the switches $SW_0$ and $SW_1$ per each input interface (input portion too) according to the above noted input IF No. (IN), an N number of protection portions 220_1-220_N (hereinafter, occasionally represented by a reference numeral 220) which determine an earlier or later arrival of the frame FR outputted from the frame sorting portions 210_1 and 210_2 and reproduce the original data DT, and a multiplexer 230 which multiplexes the data DT outputted from the protection portions 220_1-220_N.

Furthermore the protection portion 220 is composed of, as depicted in FIG. 5, an in-device header eliminator 221 which eliminates the in-device header HD from the frame FR outputted from the switches $SW_0$ and $SW_1$ (frame sorting portions 210_1 and 210_2) to reproduce the original data DT, an address manager 222 which generates a write address WA in response to the data DT outputted from the in-device header eliminator 221 and writes the data DT in the data memory $MEM_1$, a sequence No. extraction-switch No. assigning portion 223 which extracts a sequence No. (SN) from the frame FR in parallel with the generation of the write address WA by the address manager 222 and assigns (outputs) a source switch No. (SWN) and a protection manager 224 which writes the write address WA outputted from the address manager 222 as well as the sequence No. (SN) and switch No. (SWN) outputted from the sequence No. extraction-switch No. assigning portion 223 in a protection memory $MEM_2$, determines the earlier or later arrival of the frame FR by sequentially referring to the memory $MEM_2$ and provides a read address RA or cancel address CA through the address manager 222 to the memory $MEM_1$ to read or cancel the data DT.

The protection manager 224 monitors a congested state of the switches $SW_0$ and $SW_1$ by referring to the memory $MEM_2$ and notifies the congestion information INFO {switch No. (SWN) and congested state (STS)} to the controller 10 and the input potion 200 within the same interface.

Operation Example

FIGS. 1-11

Taking as an example a case where the data $DT_1$-$DT_3$ depicted in FIG. 1 are inputted to the input portion 100 within the interface IF_1 in FIG. 3, the in-device assigning portion no provides to the copying processor 120 a frame $FR_1$ generated by assigning to the data $DT_1$ the in-device header HD in which the output IF No. (ON)="1", the input IF No. (IN)="1" and the sequence No. (SN)="1" are set.

The frame $FR_1$ is copied by the copying processor 120, provided to the switches $SW_0$ and $SW_1$ in parallel and provided to the output portion 200 in the interface IF_1 through the switches $SW_0$ and $SW_1$.

Similarly, the frame $FR_2$ (ON="1", IN="1", SN="2"), and the frame $FR_3$ (ON="1", IN="1", SN="3") are also sequentially provided to the output portion 200 in the interface IF_1.

The frame sorting portions 210_1 and 210_2 in the output portion 200 having received the frames $FR_1$-$FR_3$ outputted from the switches $SW_0$ and $SW_1$ respectively provide the frames $FR_1$-$FR_3$ to the protection portion 220_1 according to the input IF No. (IN)="1" sequentially.

Now supposing that a frame has been inputted to the protection portion 220_1 in the order of $FR_1$ ($SW_0$) (meaning the frame $FR_1$ from the switch $SW_0$; the same applying to the following)->$FR_1$ ($SW_1$)->$FR_2$ ($SW_1$)->$FR_2$ ($SW_0$)->$FR_3$ ($SW_0$)->$FR_3$ ($SW_1$), the in-device header eliminator 221 in the protection portion 220_1 sequentially eliminates the in-device header HD from the frames $FR_1$-$FR_3$ and provides the data to the data memory $MEM_1$ and the address manager 222 in the order of $DT_1$->$DT_1$->$DT_2$->$DT_2$->$DT_3$->$DT_3$.

The address manager 222 writes the data $DT_1$, $DT_1$, $DT_2$, $DT_2$, $DT_3$, $DT_3$ sequentially in addresses $A_1$-A6 of the data memory $MEM_1$ as depicted in FIG. 6A and provides the addresses $A_1$-A6 to the protection manager 224 as the write address WA.

In parallel with this, the sequence No. extraction-switch No. assigning portion 223 provides the sequence No. (SN) and the switch No. (SWN) to the protection manager 224 in the order of {1,0 ($SW_0$)}->{1,1 ($SW_1$)}->{2,1}->{2,0}->{3, 0}->{3,1}.

The protection manager 224 writes the sequence No. (SN) and the switch No. (SWN) outputted from the sequence No. extraction-switch No. assigning portion 223 as well as the write address WA outputted from the address manager 222 at addresses $B_1$-B6 of the protection memory $MEM_2$ as depicted in FIG. 6B.

Also, the protection manager 224 performs the earlier/later arrival determination processing of the frames $FR_1$-$FR_3$ by referring to the protection memory $MEM_2$ in asynchronization with the write processing in the protection memory $MEM_2$.

Namely, as depicted in FIG. 7, the protection manager 224 performs a periodical read by one record from the protection memory $MEM_2$ (step $S_1$).

Then, the protection manager 224 determines the switch selection state managed inside (step $S_2$). In a double switch system (including the initial state) where no congestion occurs in the switches $SW_0$ and $SW_1$, the protection manager 224 checks whether or not the same sequence No. (SN) as the sequence No. of the record read has been already stored in the protection memory $MEM_2$ (step $S_3$).

Now supposing that the record of the head address 81 (sequence No. (SN)="1", switch No. (SWN)="0" and write address WA="$A_1$") as depicted in FIG. 6B has been read, there is found by scan no record having the sequence No. (SN) of "1" before the reading, so that the protection manager 224 determines that the data stored at the address $A_1$ of the data memory $MEM_1$ is the first arrived data and executes the data reading to provide the address $A_1$ as the read address RA to the address manager 222 (step S4).

Accordingly, the data $DT_1$ is to be read from the address $A_1$ of the data memory $MEM_1$ depicted in FIG. 6A.

Then, the protection manager 224 starts up a timer $TIM_1$ in order to measure a delay of the data $DT_1$ later arrived (step $S_5$) and sequentially returns to the above step $S_1$, where the record of the next address $B_2$ (sequence No. (SN)="1", switch No. (SWN)="1" and write address (WA)="$A_2$") is read out of the protection memory $MEM_2$.

At this time, in the protection memory $MEM_2$ the record (address $B_1$) having stored therein the sequence No. (SN)="1" already exists, so that the protection manager 224 determines at the above step $S_3$ that the data stored at the address $A_2$ of the data memory $MEM_1$ is later arrived data and checks whether or not the timer $TIM_1$ started up at the above step $S_5$ lapses or is timed out (step S6).

Now the later arrived data $DT_1$ succeeds the earlier arrived data $DT_1$, so that the timer $TIM_1$ is not timed out and the protection manager 224 performs data discard processing (data discarding) in which the address $A_2$ is provided to the address manager 222 as the cancel address CA (step $S_7$).

Therefore, the data $DT_1$ stored at the address $A_2$ of the data memory $MEM_1$ is not read but is to be discarded.

The above steps $S_1$-$S_7$ are repeatedly executed, whereby the earlier arrived data $DT_2$ and $DT_3$ stored at the addresses $A_3$ and $A_5$ of the data memory $MEM_1$ are read while the later arrived data $DT_2$ and $DT_3$ stored at the address $A_4$ and A6 are discarded.

Thus, from the protection portion 220 (i.e. the output portion 200) the data $DT_1$-$DT_3$ are to be outputted in this order without duplication.

On the other hand, when the timer $TIM_1$ is timed out at the above step S6, the protection manager 224 executes the data discarding (step S8) as with the above step $S_7$ and determines that the switch corresponding to the switch No. (SWN) in the record read is in a congested state, thereby transitioning to a single switch system state where the frame FR outputted from the switch should not be selected (step $S_9$).

At this time, the protection manager 224 executes notifying the congestion information INFO (hereinafter, referred to as congestion information notifying) of the switch to the input portion 100 within each interface IF as will be described later.

It is to be noted that in a case where the data DT is a segment of a fixed length inputted at fixed intervals, instead of the above timer TIM the delay may be estimated by counting the record number (i.e. the number of the other data) between the earlier arrived data—the later arrived data.

Sequentially having read the record from the protection memory $MEM_2$, the protection manager 224 checks whether or not the switch No. (SWN) in the record is consistent with a switch in the congested state (step $S_{10}$).

When the switch No. (SWN) is not consistent with the switch in the congested state, the protection manager 224 executes the data read processing by using the write address WA in the record read (step $S_{11}$) and starts up a timer $TIM_2$ in order to measure the delay of the frame FR outputted from the switch in the congested state and stored with the same sequence No. (SN) (step $S_{12}$), where this timer $TIM_2$ may be replaced by one the same one as the above timer $TIM_1$.

When at the above step $S_{10}$ the switch No. (SWN) in the record read out of the protection memory $MEM_2$ is consistent with the switch in the congested state, the protection manager 224 checks whether or not the timer $TIM_2$ started up at the above step $S_{12}$ is timed out (step $S_{13}$).

When the timer $TIM_2$ is already timed out, the protection manager 224 determines that the switch is still in the congested state and executes the data discarding (step $S_{14}$).

When the timer $TIM_1$ is not timed out, the protection manager 224 executes the data discarding (step $S_{15}$) and determines that the congested state of the switch is released or resolved and transitions to the double-system state again (step $S_{16}$).

Figure 8:
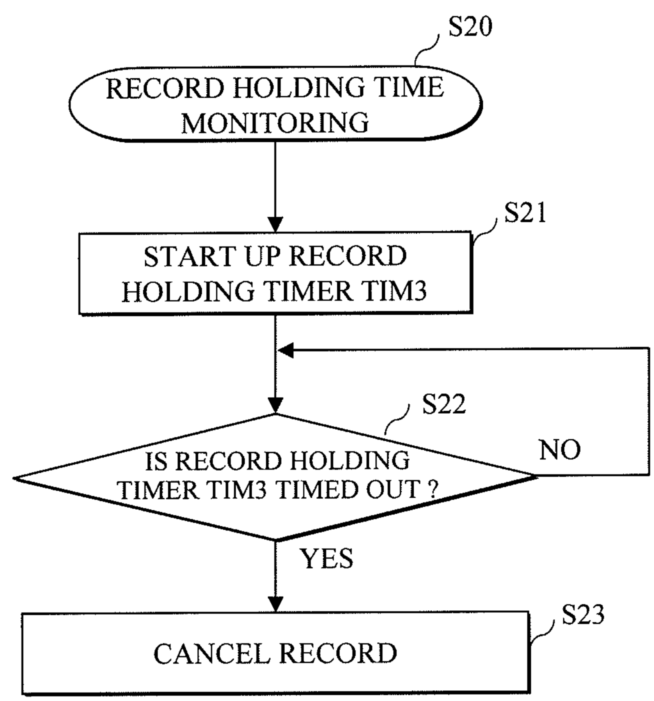
FIG. 8 is a flow chart depicting a record holding time monitoring example in a protection manager used in an embodiment [1] of a data transmission device and method.

Also, every time reading of the record from the protection memory $MEM_2$ at the above step $S_1$, the protection manager 224 executes record holding time monitoring depicted in FIG. 8 (step $S_{20}$).

Namely, the protection manager 224 starts up a record holding timer $TIM_3$ for a record every time the record in the protection memory $MEM_2$ is used for determining the earlier or later arrival (step $S_{21}$).

The protection manager 224 holds the record until the timer $TIM_3$ is timed out (step $S_{22}$) and cancels it when the timer $TIM_3$ is timed out (step $S_{23}$).

Congestion Information Notification Processing Example (1)

FIG. 9

Figure 9:
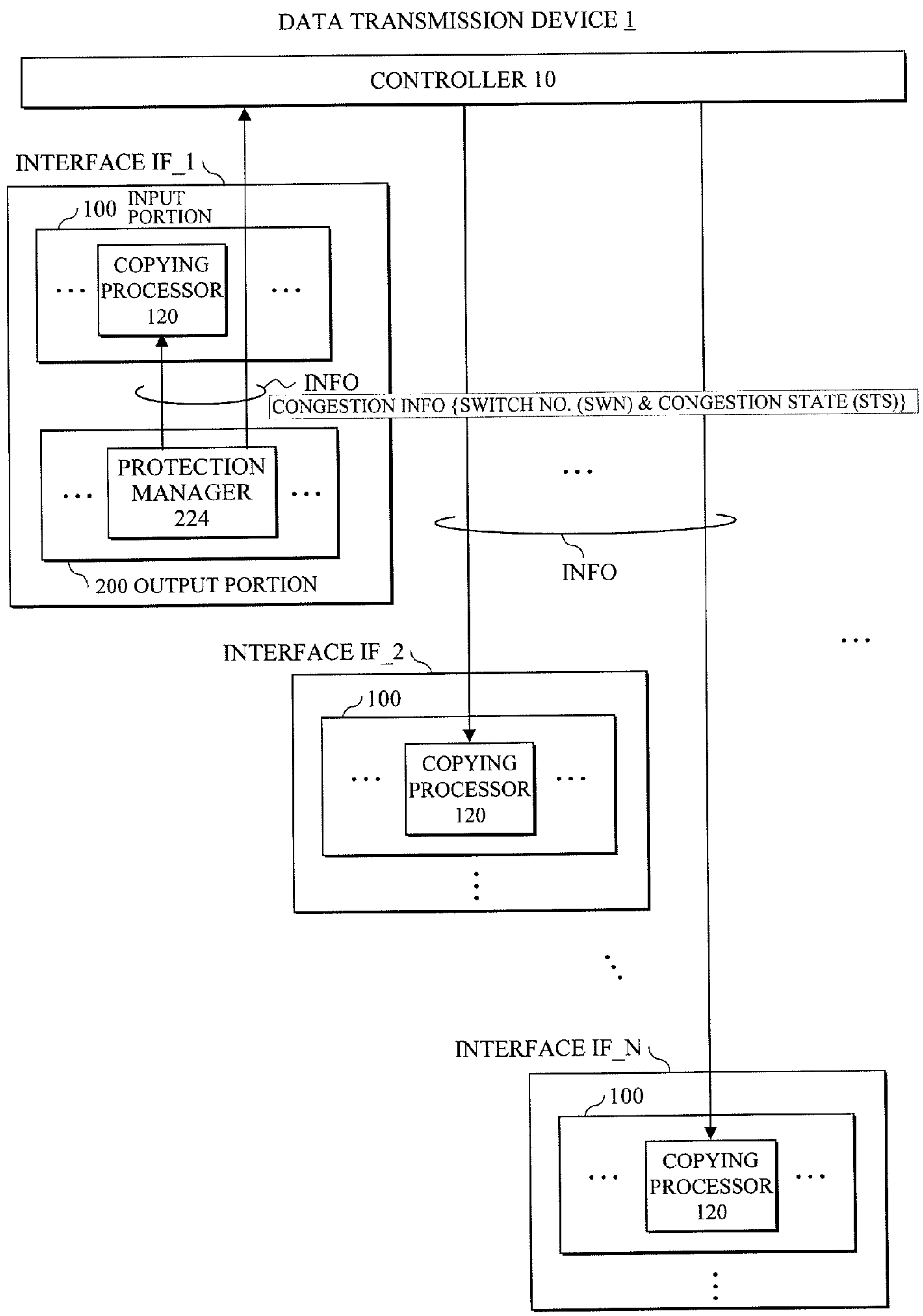
FIG. 9 is a block diagram depicting a congestion information notifying example (1) of an embodiment [1] of a data transmission device and method.

Upon transitioning to the single-system state at step $S_9$ depicted in FIG. 7, the protection manager 224 notifies the congestion information INFO in which the switch No. (SWN) of the switch in the congested state and the congested state STS (congestion occurrence) are set to the copying processor 120 in the interface IF_1 and the controller 10 as depicted in FIG. 9.

In response, the copying processor 120 in the interface IF_1 stops copying the frame FR and outputting the frame FR to the switch corresponding to the switch No. (SWN) notified.

The controller 10 transfers the congestion information INFO to each copying processor 120 within the other interfaces IF_2-IF_N, whereby each copying processor 120 within the interfaces IF_2-IF_N stops outputting the frame FR to the switch in the congested state in the same manner as the copying processor 120 within the interface IF_1.

Then in a specified time interval, the protection manager 224 deems that the congested state of the switch is released, notifying the congestion information INFO in which the switch No. (SWN) and the congested state (STS) (congestion released) are set to the copying processor 120 within the interface IF_1 and the controller 10.

Thus, each copying processor 120 within the interfaces IF_1-IF_N restarts outputting the frame FR to the switch in the congested state released.

It is to be noted that as in the following congestion information notifying example (2), the congestion information INFO may be notified without involving the controller 10.

Congestion Information Notification Processing Example (2)

Figure 10:
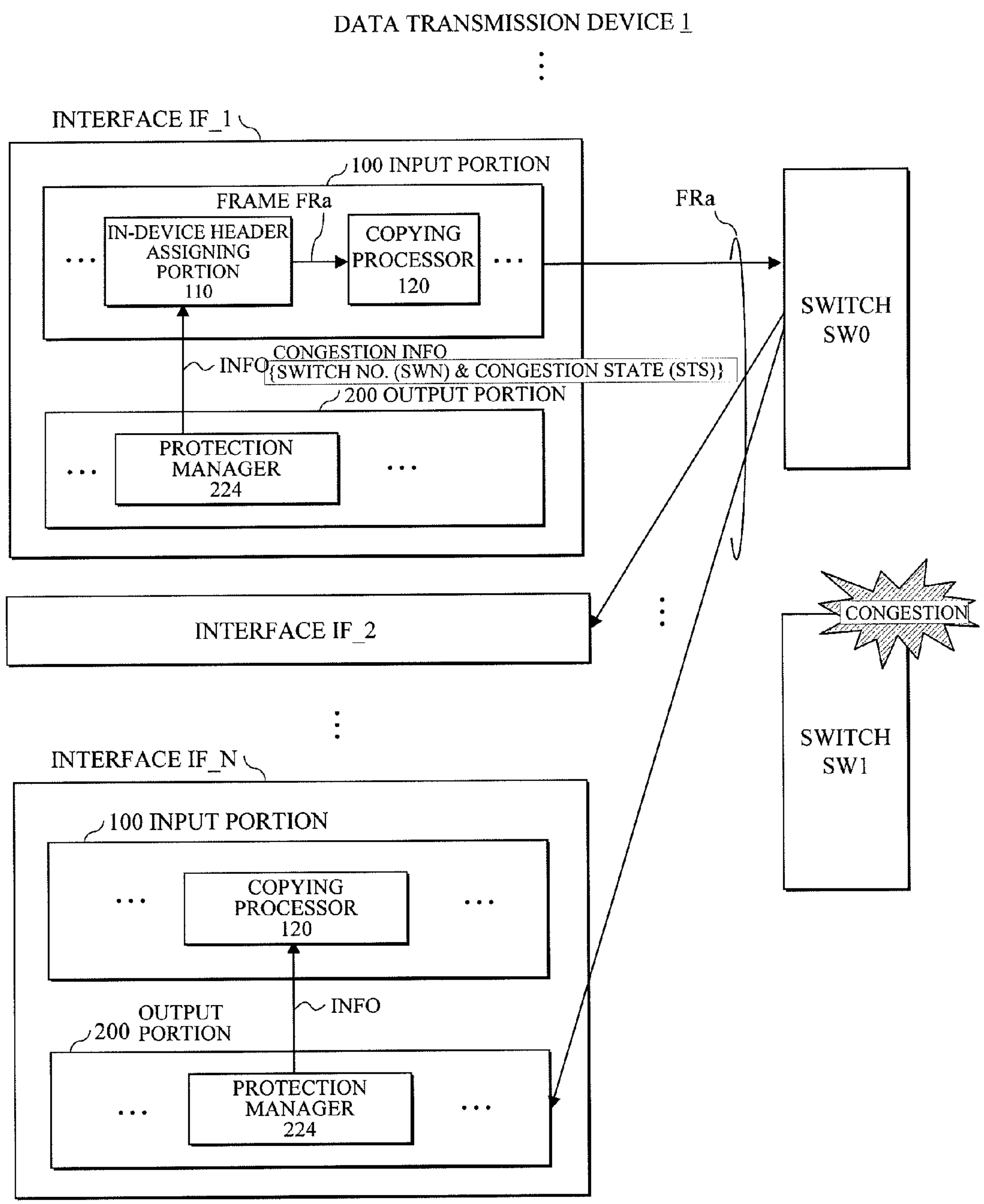
FIG. 10 is a block diagram depicting a congestion information notifying example (2) of an embodiment [1] of a data transmission device and method.
Figure 11:
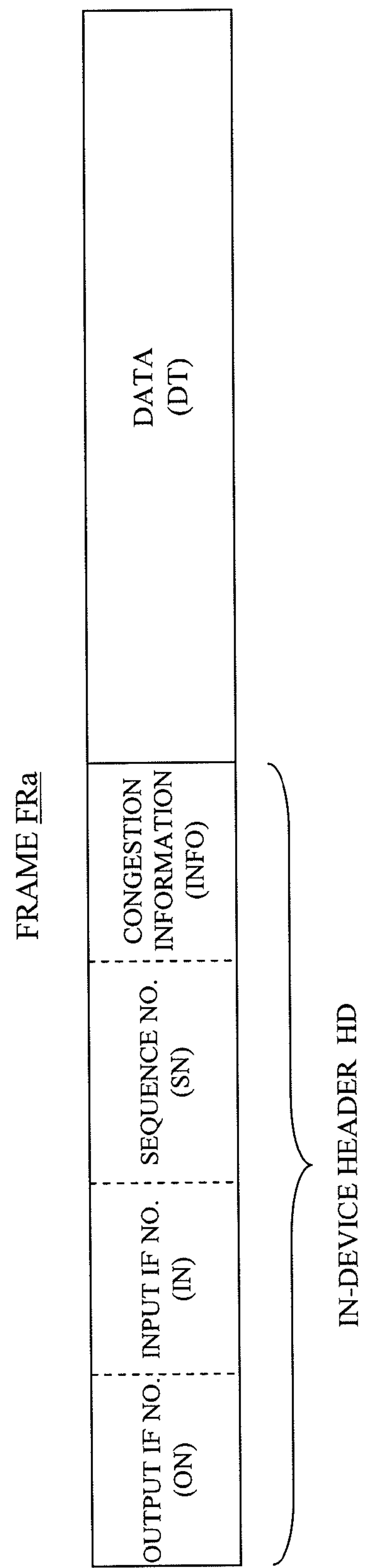
FIG. 11 is a block diagram depicting a frame format example used in a congestion information notifying process example (2) of an embodiment [1] of a data transmission device and method.

FIGS. 10 and 11

As depicted in FIG. 10, the protection manager 224 in the interface IF_1 notifies the congestion information INFO to the in-device header assigning portion 100 in the interface IF_1, different from the above processing example (1).

In response, the in-device header assigning portion 110 generates a frame FRa in which the congestion information INFO is further set in the in-device header HD as depicted in FIG. 11 and provides it to the copying processor 120. The copying processor 120 identifies the switch $SW_0$ uncongested from the congestion information INFO in the frame FRa as depicted in FIG. 10 and provides as an output the frame FRa.

Each protection manager 224 in the other interfaces IF_2-IF_N having received the frame FRa from the switch $SW_0$ notifies the congestion information INFO to each copying processor 120.

Thus, each copying processor 120 in the interfaces IF_1-IF_N is stopped to output the frame to the switch $SW_1$ in the congested state.

Then in a specified time interval, the protection manager 224 in the interface IF_1 deems that the congested state of the switch $SW_1$ is released in the same manner as the above processing example (1) and notifies the congestion information INFO where the switch No. (SWN (1)) and the congested state (STS) (congestion released) are set to the in-device header assigning portion 110.

The in-device header assigning portion no generates the frame FRa in which the congestion information INFO is set and provides it to the copying processor 120, which further provides the frame FRa to the switches $SW_0$ and $SW_1$ in parallel.

Thus, each copying processor 120 within the other interfaces IF_2-IF_N recognizes that the congested state of the switch $SW_1$ is released and restarts outputting the frame to the switch $SW_1$.

Figure 13:
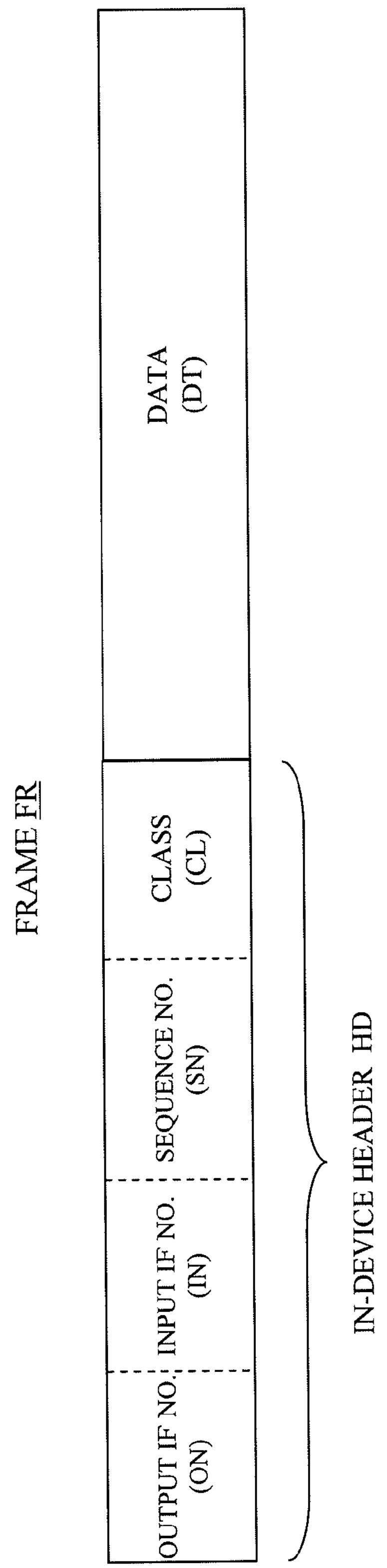
FIG. 13 is a diagram depicting a frame format example used in an embodiment [2] of a data transmission device and method.
Figure 14A:
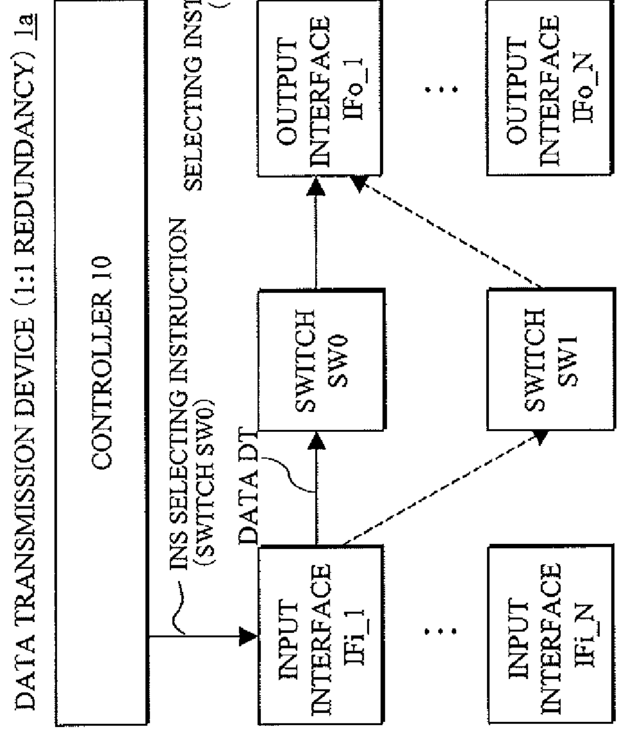
FIG. 14 is a block diagram depicting a related art example [1] of a data transmission device.
Figure 14B:
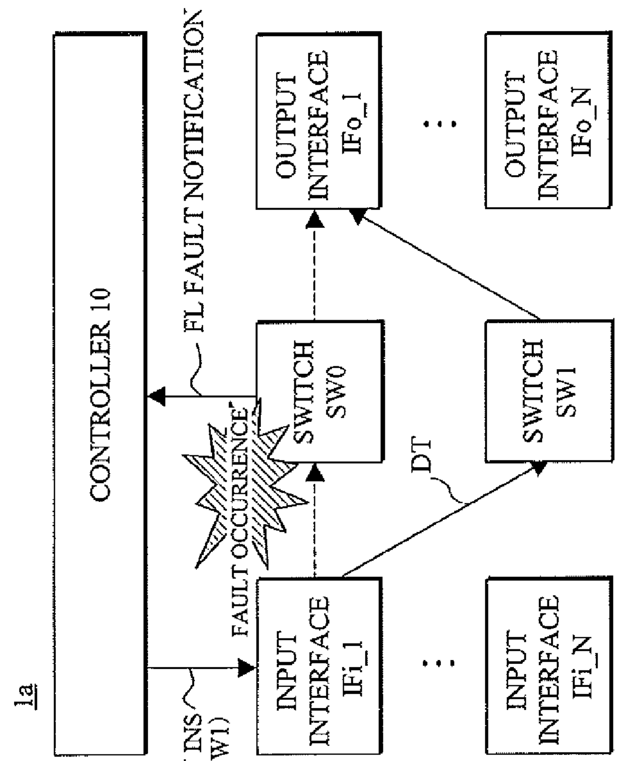
Figure 15B:
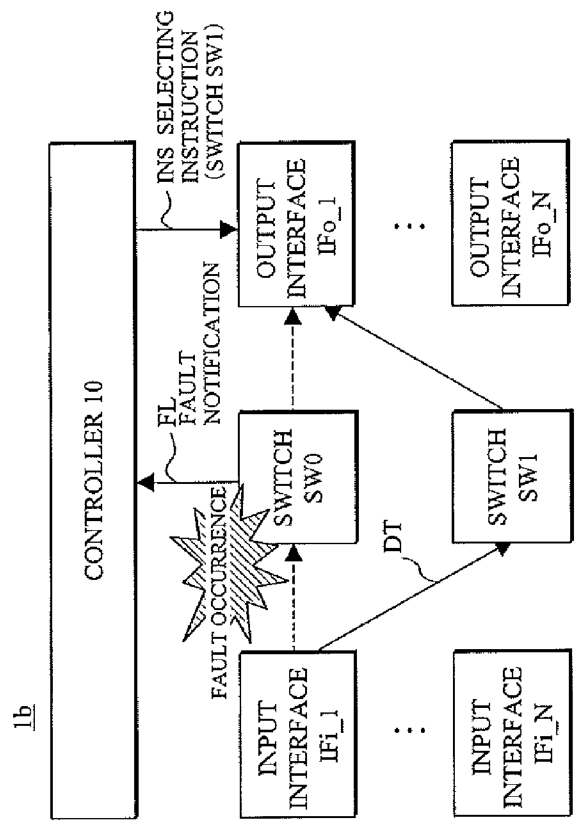
FIG. 15 is a block diagram depicting a related art example [2] of a data transmission device.
Figure 15A:
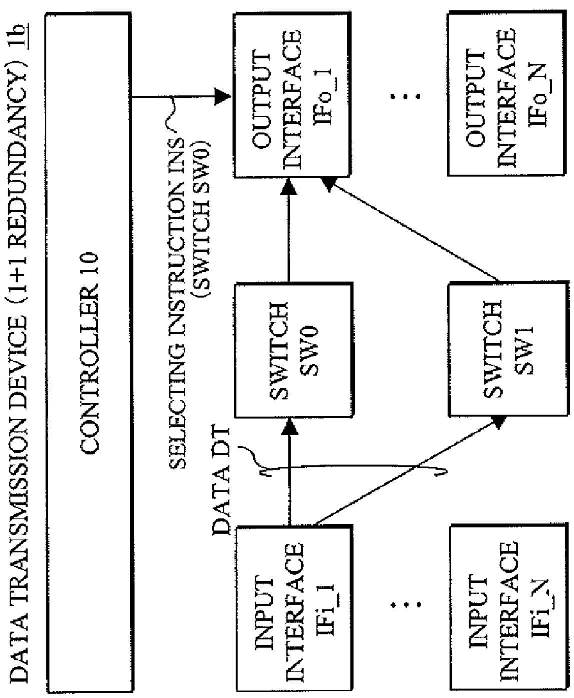

Embodiment [2]: FIGS. 12 and 13

The input portion 100 of the data transmission device 1 depicted in FIG. 12 includes, in addition to the arrangement of the above embodiment [1], an n class classifier 130 for classifying the data DT into an n number of classes (priorities) based on specified information in the data DT inputted, in which there are correspondingly provided an n number of in-device header assigning portions 110_1-110_n and an n number of copying processors 120_1-120_n. Also, the input portion 100 has multiplexers 140_1 and 140_2 which respectively multiplex the frame FR outputted from the copying processor 120_1-120_n to be provided to the switches $SW_0$ and $SW_1$.

Also in the output portion 200, there are provided an m (interface number N*class number n) of protection portions 220_1-220_m.

In operation, the n class classifier 130 provides the data DT to any one of the in-device header assigning portions 110_1-110_n in accordance with e.g. a source address, a destination address (not depicted) or the like in the data DT.

The in-device header assigning portions 110_1-110_n respectively generate the frame FR in which a class CL preliminarily assigned to itself is set in the in-device header HD as depicted in FIG. 13.

The copying processor 120_1-120_n respectively copy the frame FR outputted from the in-device header assigning portions 110_1-110_n to be provided to the multiplexers 140_1 and 140_2 in parallel.

Thus, the frame FR outputted from the copying processors 120_1-120_n is multiplexed by the multiplexers 140_1 and 140_2 and then provided to the switches $SW_0$ and $SW_1$ respectively.

The switches $SW_0$ and $SW_1$ respectively performs a priority control (such as a control to output the frame FR where a class CL with a higher priority is set in prior to the frame with a lower priority class CL) based on the class CL in the frame FR and provides it to the output portion 200 in the interface corresponding to the output IF No. (ON).

The frame sorting portions 210_1 and 210_2 within the output portion 200 respectively sort the frame FR per input IF No. (IN) and class CL to be provided to one of the protection portions 220_1 and 220_*m*.

Thus, in each in the protection portions 220_1-220_m, as with the above embodiment [1], the earlier or later arrival determination processing of data and congested state monitoring processing of switch are to be performed.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A data transmission device comprising:

switches with redundancy, each outputting a frame in its input order;

input interfaces, each coupled to each switch, generating frames in which every time data is inputted, input order information indicating the input order is added to the data together with unique information of each input interface and providing the frames generated to the switches in parallel; and at least one output interface sequentially storing the frames outputted from the switches for every unique information and selecting a first arrived frame among the frames stored with same input order information, wherein the output interface stores the frames in association with the switches having outputted the frames, determines that when the frames stored with the same input order information after a first specified time has lapsed from the selecting of the first arrived frame are detected, the switch corresponding to the frames detected is in a congested state and excludes following frames outputted from the switch in the congested state from being selected.

2. The data transmission device as claimed in claim 1, wherein after the frames outputted from the switch in the congested state are excluded from the selecting and before a second specified time has lapsed from the selecting of the first arrived frame, when the frames outputted from the switch in the congested state and stored with the same input order information are detected, the output interface determines that the congested state is released and includes following frames outputted out of the switch released from the congested state, as frames to be selected again.

3. The data transmission device as claimed in claim 1, further comprising a controller controlling the input interfaces and the output interface, wherein the output interface notifies information of the switch in the congested state to the input interfaces through the controller, so that the input interfaces stop outputting the frames to the switch in the congested state.

4. The data transmission device as claimed in claim 3, wherein the output interface deems that the congested state is released when a second specified time has lapsed from the notification of the information of switch in the congested state and notifies through the controller the information of the switch released from the congested state to the input interfaces, so that the input interfaces restart outputting the frames to the switch released from the congested state.

5. The data transmission device as claimed in claim 1, wherein the input interfaces and the output interfaces are provided in pairs, in which one output interface having first determined the switch in the congested state notifies to one input interface forming a pair with the one output interface the information of the switch in the congested state to stop the one input interface from outputting the frames to the switch in the congested state and generates frames added with the information of the switch in the congested state to be provided to the other switches, so that the other output interfaces determine the switch in the congested state and to notify the information of the switch in the congested state to the other input interfaces to stop the other input interfaces from outputting the frames to the switch in the congested state.

6. The data transmission device as claimed in claim 5, wherein the one output interface deems that the congested state is released when a second specified time has lapsed from the notification of the information of switch in the congested state and notifies the information of the switch released from the congested state to the one input interfaces to restart the one input interface to output the frames to the switch released from the congested state and add the information of the switch released from the congested state to the frames to be provided to each switch in parallel, so that the other output interfaces determine the switch released from the congested state and to notify to the other input interfaces the information of the switch released from the congested state, so that the other input interfaces restart outputting the frames to the switch released from the congested state.

7. The data transmission device as claimed in claim 1, wherein the input interfaces classify the data into a plurality of classes based on specified information within the data and generate a frame in which class information, the unique information and the input order information are added to the data per each class, wherein the switches perform a priority control upon outputting the frames based on the class information and the output interface sequentially stores the frames outputted from the switches per each unique information and class information.

8. The data transmission device as claimed in claim 1 wherein the input order information comprises a sequence number or time stamp.

9. The data transmission device as claimed in claim 8, wherein if the sequence number is a number circulated within specified numerical values, the output interface eliminates a frame stored after a first arrived frame by a fixed time which the sequence number can circulate, the frame stored and the first arrived frame have same sequence number.

10. A data transmission method comprising:

a step of each of switches with redundancy outputting a frame in its input order;

a step of input interfaces, each coupled to each switch, generating frames in which every time data is inputted, input order information indicating the input order is added to the data together with unique information of each input interface and providing the frames generated to the switches in parallel; and a step of at least one output interface sequentially storing the frames outputted from the switches for every unique information and selecting a first arrived frame among the frames stored with same input order information, wherein the output interface stores the frames in association with the switches having outputted the frames, determines that when the frames stored with the same input order information after a first specified time has lapsed from the selecting of the first arrived frame are detected, the switch corresponding to the frames detected is in a congested state and excludes following frames outputted from the switch in the congested state from being selected.

11. The data transmission method as claimed in claim 10, wherein after the frames outputted from the switch in the congested state are excluded from the selecting and before a second specified time has lapsed from the selecting of the first arrived frame, when the frames outputted from the switch in the congested state and stored with the same input order information are detected, the output interface determines that the congested state is released and includes following frames outputted out of the switch released from the congested state, as frames to be selected again.

12. The data transmission method as claimed in claim 10, further comprising a step of a controller controlling the input interfaces and the output interface, wherein the output interface notifies information of the switch in the congested state to the input interfaces through the controller, so that the input interfaces stop outputting the frames to the switch in the congested state.

13. The data transmission method as claimed in claim 12, wherein the output interface deems that the congested state is released when a second specified time has lapsed from the notification of the information of switch in the congested state and notifies through the controller the information of the switch released from the congested state to the input interfaces, so that the input interfaces restart outputting the frames to the switch released from the congested state.

14. The data transmission method as claimed in claim 10, wherein the input interfaces and the output interfaces are provided in pairs, in which one output interface having first determined the switch in the congested state notifies to one input interface forming a pair with the one output interface the information of the switch in the congested state to stop the one input interface from outputting the frames to the switch in the congested state and generates frames added with the information of the switch in the congested state to be provided to the other switches, so that the other output interfaces determine the switch in the congested state and to notify the information of the switch in the congested state to the other input interfaces to stop the other input interfaces from outputting the frames to the switch in the congested state.

15. The data transmission method as claimed in claim 14, wherein the one output interface deems that the congested state is released when a second specified time has lapsed from the notification of the information of switch in the congested state and notifies the information of the switch released from the congested state to the one input interfaces to restart the one input interface to output the frames to the switch released from the congested state and add the information of the switch released from the congested state to the frames to be provided to each switch in parallel, so that the other output interfaces determine the switch released from the congested state and to notify to the other input interfaces the information of the switch released from the congested state, so that the other input interfaces restart outputting the frames to the switch released from the congested state.

16. The data transmission method as claimed in claim 10, wherein the input interfaces classify the data into a plurality of classes based on specified information within the data and generate a frame in which class information, the unique information and the input order information are added to the data per each class, wherein the switches perform a priority control upon outputting the frames based on the class information and the output interface sequentially stores the frames outputted from the switches per each unique information and class information.

17. The data transmission method as claimed in claim 10 wherein the input order information comprises a sequence number or time stamp.

18. The data transmission method as claimed in claim 17, wherein if the sequence number is a number circulated within specified numerical values, the output interface eliminates a frame stored after a first arrived frame by a fixed time which the sequence number can circulate, the frame stored and the first arrived frame have same sequence number.

* * * * *